US012706550B2

(12) United States Patent
González Senosiáin et al.

(10) Patent No.: US 12,706,550 B2
(45) Date of Patent: Aug. 11, 2026

(54) CONTROL METHOD AND SYSTEM FOR DC/AC CONVERTERS

(71) Applicant: INGETEAM POWER TECHNOLOGY, S.A., Zamudio (ES)

(72) Inventors: Roberto González Senosiáin, Sarriguren (ES); Julián Balda Belzunegui, Sarriguren (ES); Manuel Navarrete Khibit, Sarriguren (ES); Andoni Urtasun Erburu, Pamplona (ES); Ioseba Erdocia Zabala, Pamplona (ES); Luis Marroyo Palomo, Pamplona (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 78 days.

(21) Appl. No.: 18/573,554

(22) PCT Filed: Jun. 22, 2021

(86) PCT No.: PCT/ES2021/070463

§ 371 (c)(1),
(2) Date: Dec. 22, 2023

(87) PCT Pub. No.: WO2022/269104

PCT Pub. Date: Dec. 29, 2022

(65) Prior Publication Data

US 2024/0305220 A1 Sep. 12, 2024

(51) Int. Cl.
*H02M 7/5387* (2007.01)
*H02J 3/38* (2026.01)
(Continued)

(52) U.S. Cl.
CPC ..... *H02M 7/53875* (2013.01); *H02M 1/0025* (2021.05); *H02M 1/32* (2013.01); *H02J 3/381* (2013.01)

(58) Field of Classification Search
CPC .... H02M 1/0016; H02M 1/0025; H02M 1/32; H02M 1/325; H02M 7/537–5395; H02J 3/38–40
See application file for complete search history.

(56) References Cited

U.S. PATENT DOCUMENTS 6,404,655 B1 * 6/2002 Welches .............. H02M 7/4807 363/56.02
6,693,409 B2 * 2/2004 Lynch ...................... H02J 3/18 307/64

(Continued)

FOREIGN PATENT DOCUMENTS

EP 2 469 699 A2 6/2012
EP 2 930 840 A2 10/2015

OTHER PUBLICATIONS

International Search Report for PCT/ES2021/070463 dated Mar. 21, 2022.
Written Opinion for PCT/ES2021/070463 dated Mar. 21, 2022.

*Primary Examiner* — Fred E Finch, III
(74) *Attorney, Agent, or Firm* — Sughrue Mion, PLLC

(57) ABSTRACT

Control method for an electronic DC/AC converter (1), wherein for at least one phase: calculating a first reference voltage ($e_{r,v}$, $e_{s,v}$, $e_{t,v}$) from predefined voltage setpoints (22) and a phase voltage ($V_{c_r}$, $V_{c_s}$, $V_{c_t}$); calculating a second reference voltage $$(e_{r,i}^{pos}, e_{s,i}^{pos}, e_{t,i}^{pos})$$

based on a difference between a predefined upper current limit ($I_{max}$) and the current ($i_r$, $i_s$, $i_t$) of said at least one phase, and on the phase voltage; calculating a third reference voltage (Continued)

$$\left(e_{r,i}^{neg},\ e_{s,i}^{neg},\ e_{t,i}^{neg}\right)$$

based on a difference between a predefined lower current limit ($-I_{max}$) and the current of said at least one phase, and on the phase voltage; comparing the first reference voltage ($e_{r,v}$, $e_{s,v}$, $e_{t,v}$) with the second reference voltage $$\left(e_{r,i}^{pos},\ e_{s,i}^{pos},\ e_{t,i}^{pos}\right)$$

selecting the lowest voltage of the two; comparing the selected reference voltage with the third reference voltage $$\left(e_{r,i}^{neg},\ e_{s,i}^{neg},\ e_{t,i}^{neg}\right)$$

selecting as the control voltage ($e_{r,s}$, $e_{s,s}$, $e_{t,s}$) the highest of the two; and applying the selected control voltage ($e_{r,s}$, $e_{s,s}$, $e_{t,s}$) to the at least one phase of the converter.

20 Claims, 12 Drawing Sheets

(51) Int. Cl.
*H02M 1/00* (2007.01)
*H02M 1/32* (2007.01)

(56) References Cited

U.S. PATENT DOCUMENTS 10,224,831 B1 * 3/2019 Hurtado ............... H03K 17/042
2022/0255461 A1 * 8/2022 Li ..................... H02M 7/53873
2024/0097560 A1 * 3/2024 Unruh ...................... H02H 9/02

* cited by examiner

CONTROL METHOD AND SYSTEM FOR DC/AC CONVERTERS

This Application is a National Stage of International Application No. PCT/ES2021/070463 filed Jun. 22, 2021.

FIELD OF THE INVENTION

The present invention pertains to the power grid sector, and particularly to the sector of electronic converters for connecting renewable energy generation sources to the power grid. More specifically, the invention relates to a control method and system for electronic converters.

PRIOR STATE OF THE ART

The current environmental crisis is causing a significant penetration of renewable generation sources, such as photovoltaic and wind generation, and storage systems, such as batteries, in the power grid. The connection of these systems to the power grid is done by means of electronic direct current-to-alternating current converters, also called inverters. This is causing synchronous generators to be replaced with distributed generators based on electronic converters. However, up until now synchronous generators have been the main elements responsible for maintaining power grid quality and stability. This is due to their operation as a voltage source and their capability for supplying surge currents in fault situations, managing active power, supplying harmonics and imbalances and supplying inertia to the system, among others.

Generally, inverters have been connected to the grid controlled as a sinusoidal current source at fundamental frequency, such that they follow the voltage waveform at the connection point to deliver the desired active and reactive powers. This control provides a correct behaviour under the assumption of the availability of a robust voltage grid. However, the growing penetration of renewable energy sources connected through electronic converters is causing the power ratio of synchronous generators to drop with respect to the total power of the system. In this scenario, maintaining control of electronic converters today would compromise medium-term power grid quality and stability. To avoid this, electronic converters will have to provide the functionalities provided at present by synchronous generators.

For this purpose, new control strategies for these electronic converters encompassed within the grid-forming concept have been proposed, such as droop control, virtual synchronous generator and virtual voltage oscillator. In all of them, the electronic converter behaves like a voltage source, directly or indirectly. This behaviour provides the system with new functionalities, such as the capability to restore grid voltage in the event of a failure and working in an isolated manner.

In this situation, electronic converters must therefore contribute to maintaining the voltage at all times and cannot be disconnected from the system in fault or overload situations. These events can give rise to currents which may exceed the rated current of the inverter several times over. This does not constitute a problem for the synchronous generator which is capable of providing large surge currents as a result of its high thermal time constant (around one hour). However, in the case of semiconductors used in electronic converters, this constant is in the order of several milliseconds. As a result, any overcurrent caused by faults or overloads could cause the destruction of the electronic converter. To avoid this, the development of control strategies which allow the current to be limited in events of this type is necessary.

A very widespread strategy consists of the implementation of a cascade control with an external voltage loop and an internal current loop the current references of which are saturated at the maximum current value allowed. An example of this method is shown in document "L. Zhang, L. Harnefors, and H.-P. Nee, "Power-Synchronization Control of Grid-Connected Voltage-Source Converters," IEEE Trans. Power Syst., vol. 25, no. 2, pp. 809-820, May 2010". This technique has the drawback that the operation of the current control in situations in which it is not necessary to limit current causes a greater harmonic distortion of the generated voltage, in the event that harmonic current components are required of the electronic converter. To solve this problem, the introduction of resonant controllers tuned to the typical frequencies at which these harmonics usually appear has been proposed. However, in some non-linear loads, such as cycloconverters, harmonics do not always appear at the same frequency, so the problem is not altogether avoided. In addition to this drawback, implementation of the cascade control is not feasible in high-power inverters, given that their low switching and sampling frequencies make the decoupling of both loops and obtaining an acceptable dynamic for voltage control impossible.

Since it is not feasible to implement cascade controls in high-power electronic converters, the implementation of a single voltage loop for carrying out the control is being promoted. A widespread technique for limiting current with a single voltage loop consists of emulating a transient virtual impedance in the references of the control. Controlling the value of the current by means of acting on voltage references is thereby intended. An example of this method is shown in U.S. Ser. No. 10/756,536B2. This control has the drawback that the precision of virtual impedance for limiting voltage references depends directly on the type of fault and on where it occurs, so the value to which the current is limited also depends on these factors. This renders the method less effective since in fault situations, the inverter is required to provide maximum current to the system in order to cause the protections to open and the fault to thus dissipate. Another drawback of this technique is that it does not ensure control of the current in the initial transients of faults or overloads since current is not controlled directly, rendering the method less robust.

Another one of the methods proposed with a single voltage loop and which, like the previous method, is also based on limiting current by limiting the voltage generated by the inverter, consists of calculating the maximum amplitude of the voltage that could be generated by the electronic converter without the risk of overcurrent. This maximum voltage is calculated from the voltage measurement at the connection point, the impedance from the electronic converter to the connection point and the maximum current withstood by the electronic converter. Limiting current by means of the open-loop limitation of the maximum voltage amplitude generated by the electronic converter has thereby been proposed. An example of this method can be found in U.S. Pat. No. 7,804,184B2. However, the open-loop limitation of voltage causes this method to be imprecise for limiting current, rendering the method less robust. Furthermore, this technique also has the drawback of being an RMS control, such that it is slow and causes an overcurrent to occur in the initial instants of faults or overloads, which can damage the electronic converter.

To avoid the loss of precision in limiting the current and to also avoid the introduction of an internal current loop, switching the operating mode of the electronic converter over from a voltage source to a current source when the fault is detected has been proposed. An example of this method can be found in document "X. Pei and Y. Kang, "Short-Circuit Fault Protection Strategy for High-Power Three-Phase Three-Wire Inverter," IEEE Trans. Ind. Informatics, vol. 8, no. 3, pp. 545-553, August 2012". However, this method has the drawback that it is necessary to incorporate a fault detection mechanism which makes it possible to change the operating mode. It also has the drawback that due to the time needed for detecting the presence of a fault or overload in the system and changing the operating mode, the method is not capable of limiting overcurrents in the initial instants of these events.

To avoid overcurrent during the initial instants of faults or overloads in the last three methods mentioned, some authors complement their method with the implementation of current limiting hardware, which inhibits the pulses of semiconductors if the current exceeds a specific maximum value, with the subsequent increase in system complexity. An example of the introduction of this complementary current limitation method can be found in the aforementioned document "Short-Circuit Fault Protection Strategy for High-Power Three-Phase Three-Wire Inverter," IEEE Trans. Ind. Informatics, vol. 8, no. 3, pp. 545-553, August 2012".

DESCRIPTION OF THE INVENTION

The present invention provides a control method and system which try to overcome the drawbacks of the methods and systems described in the state of the art. Specifically, there is provided a control method and system for an electronic converter as a voltage source, providing the electronic converter with the capability to limit the current in fault or overload situations.

A first aspect of the invention relates to a control method for an electronic DC/AC converter, comprising, for at least one phase of the electronic DC/AC converter: calculating, by means of a voltage controller, a first reference voltage from predefined voltage setpoints and a phase voltage; calculating, by means of a current controller, a second reference voltage based on a difference between a predefined upper current limit and the current of said at least one phase, and on the phase voltage; calculating, by means of the current controller, a third reference voltage based on a difference between a predefined lower current limit and the current of said at least one phase, and on the phase voltage; comparing the first reference voltage with the second reference voltage; selecting the lowest reference voltage from the first reference voltage and the second reference voltage; comparing the selected reference voltage with the third reference voltage; selecting as the control voltage that should be generated by the electronic DC/AC converter the highest reference voltage from the selected reference voltage and the third reference voltage; and applying the selected control voltage to the at least one phase of the electronic DC/AC converter. The current of said at least one phase is thereby comprised between the predefined upper current limit and the predefined lower current limit. The method is preferably applied to at least one phase of the conversion stage of the converter.

A control method and system having a step executed by means of a voltage controller and a step executed by means of a current controller is thus proposed. The method and system are applicable, among others, to DC/AC (Direct Current/Alternating Current) converters. The converters can be connected in parallel with the power grid or to a system of loads isolated from the grid, whether in a separate manner or with several converters in parallel.

The current control loop thus has two branches per phase, one for controlling current at the positive maximum value and another one for controlling it at the negative maximum value. The only difference between these two branches is the reference current, which in one case is the maximum current allowed and in the other case, a more general case, the opposite thereof (i.e., the negative value of the maximum current allowed). For the execution of each branch of the current control loop, the current of the phase (or of each phase) of the converter has been previously measured. The difference between a predefined upper (or lower, as the case may be) current limit and the current of said at least one phase is also referred to as current error. This current error is used as the input of the current controller, comprising previously determined parameters.

The calculation of the first, second and third reference voltages is performed in parallel, understanding in parallel to mean that the first, second and third reference voltages are calculated in a substantially simultaneous manner (as opposed to, for example, in cascade, in which case a first voltage loop or external voltage loop determines the reference of a second current loop or internal current loop).

In a possible embodiment, the phase voltage is a voltage measured at terminals of a capacitor of an output filter of the at least one phase.

In an alternative embodiment, the phase voltage is a voltage measured at the output of the electronic converter.

It should be noted that in the event that the output filter of the at least one phase is an LC filter, the voltage measured at the output of the electronic converter is the same as the voltage measured at the terminals of the capacitor of the output filter. If, in contrast, the output filter of the at least one phase is an LCL filter, the voltage measured at the terminals of the capacitor is different with respect to the voltage at the output of the electronic converter. In this case, any of the two voltages can be used as the phase voltage.

In an alternative embodiment, the phase voltage is a voltage obtained from a line voltage measurement.

The control method is performed in a plurality of time instants. In the present description, the mentioned time instants refer to each sampling operation according to a frequency, i.e., based on a clock. Generally, the sampling frequency falls within the usual ranges of controllers used in control systems for inverters, for example, at the switching frequency of the converter or multiples or submultiples thereof.

That is, in each time instant, the voltage controller calculates the reference voltage that should be generated in one phase (or each phase) by the electronic converter for the corresponding phase to behave like an AC voltage source with specific amplitude and phase values. The selection of these values falls outside the scope of the present invention. In each time instant, the current controller calculates two reference voltages that should be generated in one phase (or each phase) by the electronic converter, such that the value of the current is between the mentioned upper current limit and the mentioned lower current limit.

In embodiments of the invention, the step of calculating the second reference voltage comprises: providing as input to a first controller module the difference between the upper current limit and the current of the at least one phase; and adding the phase voltage to a voltage at the output of the first controller module, wherein the first controller module is a proportional regulator.

In embodiments of the invention, the method comprises, before said phase voltage is added to the output voltage of the first controller module: filtering the phase voltage by means of a voltage filter; and providing a phase lead for the filtered phase voltage by means of a phase lead compensator.

In embodiments of the invention, the step of calculating the third reference voltage comprises: providing as input to a second controller module the difference between the lower current limit and the phase current; and adding the phase voltage to a voltage at the output of the second controller module, wherein the second controller module is a proportional regulator, which can be the same as the first controller module.

In embodiments of the invention, the method comprises, before said phase voltage is added to the output voltage of the second controller module: filtering the phase voltage by means of a voltage filter; and providing a phase lead for the filtered phase voltage by means of a phase lead compensator.

In embodiments of the invention, to calculate the predefined voltage setpoints (also called setpoint voltage values), any of the methods existing in the state of the art, such as grid-forming, can be used.

In embodiments of the invention, the control method is applied for each phase of the electronic DC/AC converter.

In embodiments of the invention, the electronic DC/AC converter is an electronic three-phase converter, wherein the method of the first aspect of the invention is applied to each of the phases.

In the case of a three-phase converter, in embodiments of the invention, before the step of applying the selected control voltage to the at least one phase of the conversion stage of the electronic DC/AC converter such that the current of said at least one phase is comprised between the predefined upper current limit and the predefined lower current limit, a reference voltage without a non-controlled zero sequence is obtained for each phase from the selected control voltages to compensate for the effect of a non-controlled zero sequence component contained in the selected control voltages, and those reference voltages without a non-controlled zero sequence are applied to the phases of the converter. This is done because, since the control proposed in the invention applied in three-phase converters can cause the introduction (in one or more phases) of a non-controlled zero sequence component, reference voltages without a non-controlled zero sequence are calculated so that the effect of this non-controlled zero sequence component is cancelled or at least minimised. Generation of the reference voltage in the phases in which the reference voltage originates from the current controller must be ensured at the same time.

In embodiments of the invention, if none of the three selected control voltages is imposed by the current controller, then the reference voltages without a non-controlled zero sequence coincide with the selected control voltages, i.e.: $e_r=e_{r,s}$; $e_s=e_{s,s}$; $e_t=e_{t,s}$ In embodiments of the invention, if one of the three selected control voltages is imposed by the current controller, and therefore the other two selected control voltages are imposed by the voltage controller, then the reference voltages without a non-controlled zero sequence are calculated as follows: If the voltage of phase r is the one imposed by the current controller:

$$e_r = e_{r,s};\ e_s = \frac{e_{s,s} - e_{r,s} - e_{t,s}}{2};\ e_t = \frac{e_{t,s} - e_{r,s} - e_{s,s}}{2}.$$

If the voltage of phase s is the one imposed by the current controller:

$$e_s = e_{s,s};\ e_r = \frac{e_{r,s} - e_{s,s} - e_{t,s}}{2};\ e_t = \frac{e_{t,s} - e_{r,s} - e_{s,s}}{2}.$$

If the voltage of phase t is the one imposed by the current controller:

$$e_t = e_{t,s};\ e_r = \frac{e_{r,s} - e_{s,s} - e_{t,s}}{2};\ e_s = \frac{e_{s,s} - e_{r,s} - e_{t,s}}{2}.$$

In embodiments of the invention, if two of the three selected control voltages are imposed by the current controller, and therefore the other selected control voltage is imposed by the voltage controller, then the reference voltages without a non-controlled zero sequence are calculated as follows: If the voltages of phases r and s are the ones imposed by the current controller: $e_r=e_{r,s}$; $e_s=e_{s,s}$; $e_t=-(e_{r,s}-e_{s,s})$. If the voltages of phases r and t are the ones imposed by the current controller: $e_r=e_{r,s}$; $e_t=e_{t,s}$; $e_s=-(e_{r,s}-e_{t,s})$. If the voltages of phases s and t are the ones imposed by the current controller: $e_s=e_{s,s}$; $e_t=e_{t,s}$; $e_r=-(e_{s,s}-e_{t,s})$.

In embodiments of the invention, if the three selected control voltages are imposed by the current controller, then the two control voltages corresponding to the two phases with the highest current are imposed, i.e.: If phases r and s are the two phases with the highest current: $e_r=e_{r,s}$; $e_s=e_{s,s}$; $e_t=-(e_{r,s}-e_{s,s})$. If phases r and t are the two phases with the highest current: $e_r=e_{r,s}$; $e_t=e_{t,s}$; $e_s=-(e_{r,s}-e_{t,s})$. If the two phases s and t are the two phases with the highest current: $e_s=e_{s,s}$; $e_t=e_{t,s}$; $e_r=-(e_{s,s}-e_{t,s})$.

In embodiments of the invention, the method comprises: calculating modulation components from the reference voltages without a non-controlled zero sequence and controlling switches of the conversion stage of the electronic DC/AC converter from said modulation components.

In embodiments of the invention, the method comprises: from the reference voltages without a non-controlled zero sequence, calculating modulation components; introducing a desired or controlled zero sequence component (such as a third harmonic, for example) in said modulation components, thus obtaining modulation components with a zero sequence component; and controlling switches of the conversion stage of the electronic DC/AC converter from said modulation components with a zero sequence component.

In embodiments of the invention, for controlling said switches, a pulse width modulator uses said modulation components or modulation components with a zero sequence component for generating the firing orders of the switches.

In embodiments of the invention, the method includes a step of reducing the predefined voltage setpoints if one of the control voltages is imposed by the current controller. For example, saturation techniques with anti-windup are applied.

A second aspect of the invention relates to a control system for an electronic DC/AC converter which carries out the method described in the first aspect of the invention. The control system comprises: a voltage controller configured, for at least one phase of the conversion stage of the electronic DC/AC converter, for calculating a first reference voltage from predefined voltage setpoints and a phase voltage; a current controller configured, for said at least one phase of the conversion stage of the electronic DC/AC converter, for calculating a second reference voltage based on a difference between the upper current limit and the phase current, and the phase voltage and a third reference voltage based on a difference between the lower current limit and the phase current, and the phase voltage; a control unit configured for: comparing the first reference voltage with the second reference voltage, selecting the lowest reference voltage from the first reference voltage and the second reference voltage, comparing the selected reference voltage with the third reference voltage, and selecting as the control voltage that should be generated by the conversion stage of the electronic DC/AC converter the highest reference voltage from the selected reference voltage and the third reference voltage; means for applying the selected control voltage to the at least one phase of the conversion stage of the electronic DC/AC converter. The current of said at least one phase is thereby comprised between the predefined upper current limit and the predefined lower current limit.

In embodiments of the invention, the control unit is further configured for obtaining a reference voltage without a non-controlled zero sequence for each phase of the conversion stage of the electronic DC/AC converter from said selected control voltages to compensate for the effect of a non-controlled zero sequence component contained in at least one of the selected control voltages.

In embodiments of the invention, the voltage controller further comprises a control loop for reducing the predefined voltage setpoints if one of the control voltages is imposed by the current controller.

In summary, the proposed control method and system require a simple calculation of the phase voltage and an implementation of the phase voltage which causes the phase intensity to converge in a substantially immediate manner to values situated between an upper intensity limit and lower intensity limit, such that neither the converter (also called inverter throughout this description), for example, the semiconductors thereof, nor the phases of the electric generator, are damaged due to overheating.

The control method and system of the invention allow detecting both an intensity greater than a maximum intensity and an intensity lower than a minimum intensity. It is not necessary, as in other control systems of the state of the art, to wait a certain time, for example, a half-period, to compare the real phase intensity to a maximum intensity again. The speed in detecting over-currents is very important due, for example, to the rapid heating that semiconductors experience.

The control method and system of the invention are applicable both to single-phase inverters and to each of the phases of a three-phase inverter. As described in detail in the present specification, in three-phase systems, depending on the type of electrical defect, current control can cause asymmetry in phase voltages. This asymmetry is compensated for according to certain embodiments of the invention by means of calculating a modulation component for each phase of the electronic converter.

With the control method and system of the proposed invention, the phase or, as the case may be, each of the phases of the electronic converter, is controlled, separately, as a voltage source in the instants in which there is no risk of overcurrent, i.e., in normal operating conditions, whereas in those instants in which in one phase there is a risk of overcurrent due to faults or overloads, the current control loop will automatically take control of the phase. The proposed method therefore presents the following advantages, among others:

- In normal operating conditions, the operation as a voltage source provides the inverter with all the functionalities of the grid-forming mode: management of active power, supply of harmonics and imbalances, supply of inertia and damping to the system, etc.
- In fault or overload situations, it provides the electronic converter with the capability to precisely limit current to the desired maximum value.
- Performing current control with the instantaneous value provides the electronic converter with the capability to limit overcurrents during the initial instants of faults or overloads.
- Performing a separate control per phase allows controlling and limiting current in the case of any type of faults and overloads: single-phase, two-phase and three-phase.
- It is not necessary to decouple the voltage and current loops since they are implemented in parallel and not in cascade. This allows them to be implemented with low sampling periods, which are typical in high-power electronic converters.
- It is not necessary to implement fault and mode change detection mechanisms since the transition between controls is performed instantaneously and automatically through the comparison of the instantaneous value of the reference voltages calculated by each control.

These and other advantages and features of the invention will become apparent in light of the figures and the detailed description of the invention.

As described above, the invention relates to a phase control method and to a control system capable of implementing said method.

DESCRIPTION OF A MANNER TO CARRY OUT THE INVENTION

The control method of the invention is suitable for controlling an electronic DC/AC converter 1 used as a voltage source, providing it with the capability to limit the current in those situations in which the occurrence of overcurrents, such as in faults, overloads, short circuits or voltage dips, may take place. The electronic converter 1 can be working in parallel with other electronic converters and/or electric generators. The electronic converter 1 can be connected at its output to the main power grid, to a load (for example, in the case of being a single-phase converter) or to a set of isolated loads (for example, in the case of being a three-phase converter). The events causing overcurrents can be both symmetrical and asymmetrical.

Figure 1A:
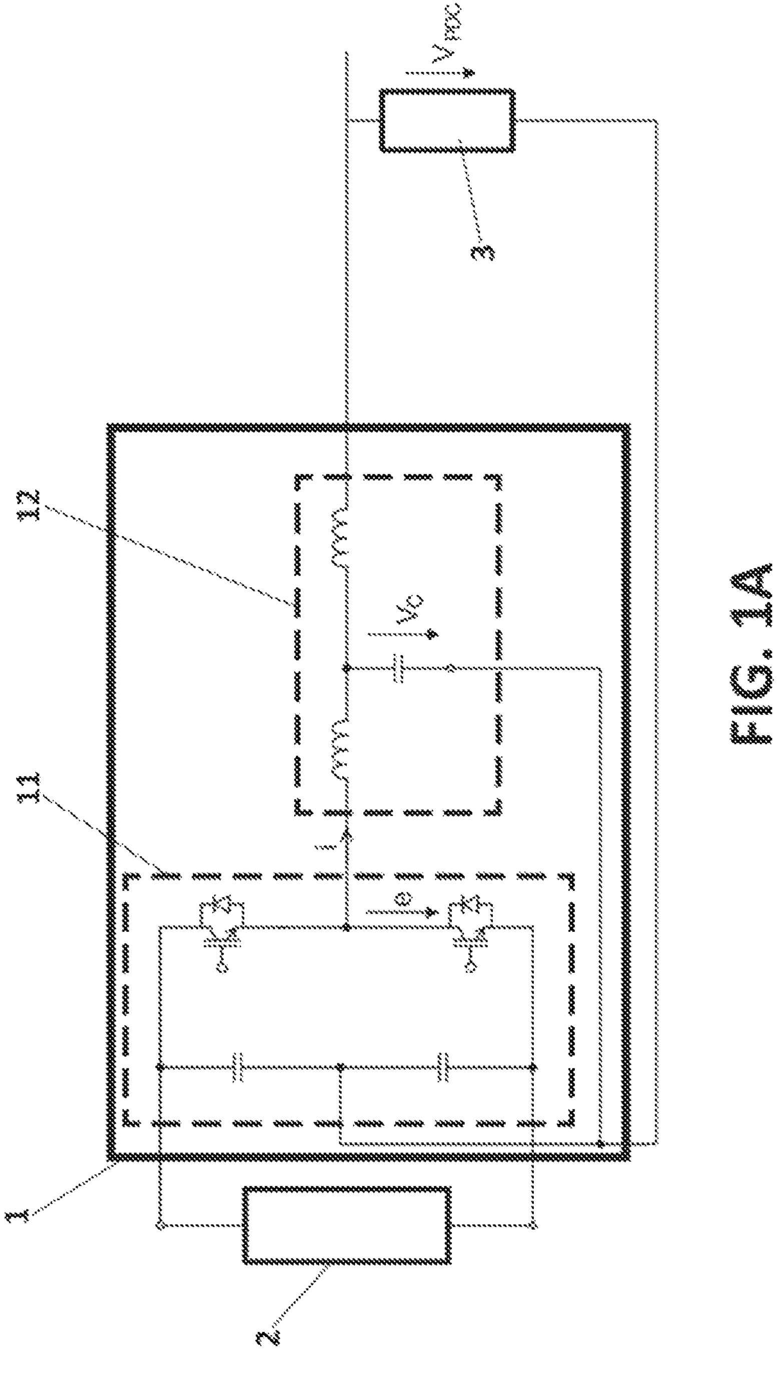
FIG. 1A shows a connection diagram of an electronic converter, the input of which is an energy source or a storage system and its output is connected to the main power grid, to a load in the case of being a single-phase converter or to several loads in the case of being a three-phase converter. The electronic converter has been schematically represented as a conversion block followed by an output filter.
Figure 1B:
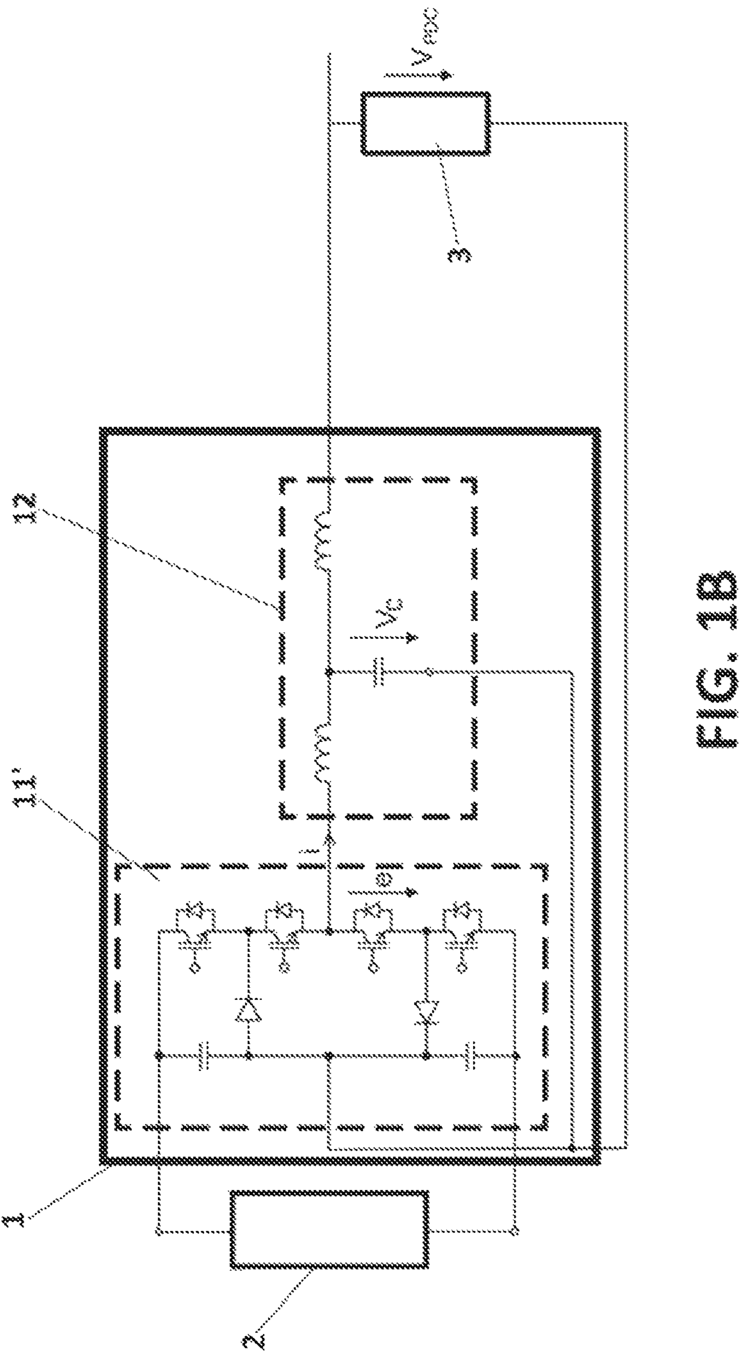
FIG. 1B shows a connection diagram of an electronic converter similar to that of FIG. 1A, with the difference being that the conversion block of the electronic converter of this figure is different with respect to the one in FIG. 1A.

FIGS. 1A and 1B show the connection diagram of an electronic converter 1, specifically of an electronic DC/AC converter. The connection diagram of an electronic DC/AC converter 1 of FIGS. 1A-1B refers both to the phase of a single-phase converter and to one of the phases of a three-phase converter. The input 2 of the converter 1 can be an energy source or a storage system. In the case of an energy source, said source can be of different types, such as a renewable (solar or wind, for example) generation source, for example. In the case of a storage system, said system can be a battery or a capacitor bank, for example. At its output, the converter 1 can be connected to the main power grid, to a load in the case of being a single-phase converter or to several loads in the case of being a three-phase converter (generally represented with reference number 3). The electronic converter 1 has been schematically represented as two blocks 11, 12 (11', 12 in FIG. 1B). Block 11, 11' represents the conversion stage. Block 12 represents the output filter. Two possible conversion diagrams 11, 11' are shown in a non-limiting manner, but a skilled person will understand that any other conventional conversion stage can be used. As regards the output filter 12, an LCL filter has been used in both figures, but an LC filter or any other variant could alternatively be used. The output filter 12 is intended for filtering switching harmonics. Between the converter 1 and the load or loads 3 or the power grid 3, there can be a transformer, which is not represented in FIGS. 1A and 1B. As discussed, the converter 1 can be a single-phase or a three-phase converter.

The control method implements a control in the electronic converter 1 based on a control of an output voltage e (hereinafter referred to as phase voltage) in one or more phases and a control of the current i of the converter (generally, of the current of at least one of its phases) which are executed at all times and in parallel. Specifically, the control method is applied to the phase (or, generally, to one or more phases) of the conversion stage 11, 11' of the converter.

In the implementation of FIGS. 1A-1B, in which the output filter 12 is an LCL filter, the phase voltage can be both the voltage Vc measured at terminals of the capacitor of the output filter 12, and the voltage $V_{PDC}$ in the grid or load (loads) 3. In the event that the output filter 12 of the phase (or phases) is an LC filter, not illustrated, the voltage measured at the output (in the grid or load 3) is the same as the voltage measured at the terminals of the capacitor of the LC filter. In that case, this voltage is the phase voltage referred to in this description. Alternatively, the phase voltage can be calculated indirectly through the line voltage measurement, not illustrated (referring, for example, to the three-phase converter).

Figure 2:
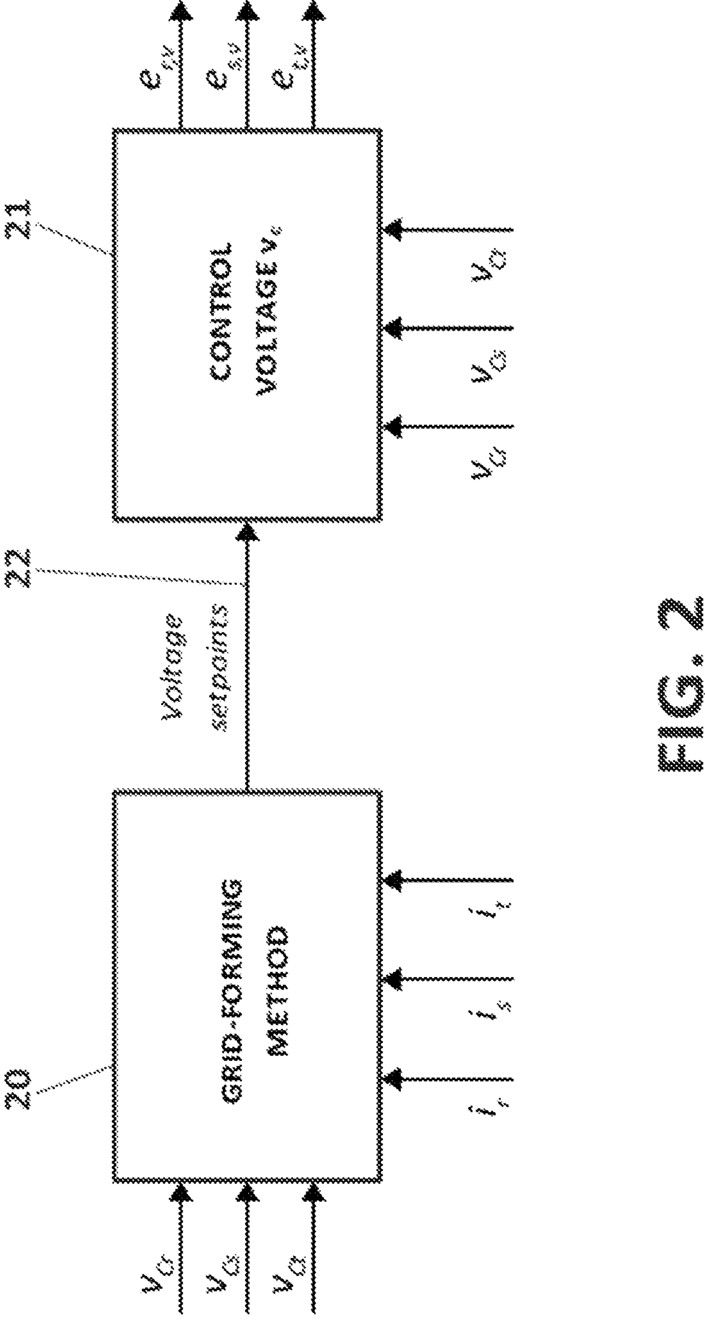
FIG. 2 shows a block diagram generically representing the embodiment of the voltage control for the electronic converter to operate as a voltage source.

In each instant, the voltage control, implemented in a voltage controller 21 shown for example in FIG. 2, calculates the reference voltages $e_{r,v}$, $e_{s,v}$, $e_{t,v}$ that should be generated in each phase (if the converter is a three-phase converter) or in the phase (if the converter is a single-phase converter) by the electronic converter 1 for this phase to behave like an AC voltage source with specific amplitude and phase values, i.e., the desired values based on the load, the loads or the grid to which the converter is to be connected. Generally, three reference voltages $e_{r,v}$, $e_{s,v}$, $e_{t,v}$ corresponding to a three-phase system are shown. In each instant, the current control loop, implemented in a current controller 30 shown for example in FIG. 3, calculates the reference voltages $$e_{r,i}^{pos}\, e_{r,i}^{neg},\ e_{s,i}^{pos}\, e_{s,i}^{neg},\ e_{t,i}^{pos}\, e_{t,i}^{neg}$$

that should be generated in each phase (if the converter is a three-phase converter) or in the phase (if the converter is a single-phase converter) by the electronic converter 1 for the current not to exceed the defined maximum value. Hereinafter, for the sake of being concise, when reference is made to "the phase" or "each phase", it should be understood that it refers to the only phase if the converter is a single-phase converter or to one or to each of the three phases if the converter is a three-phase converter. In each instant and for each phase, the reference voltages obtained are compared according to the method described below.

In normal operating conditions, the voltage generated by the inverter in each phase is thereby equal to the reference voltage calculated by the control of the output voltage, i.e., the electronic converter 1 generates the previously calculated voltage setpoints 22. However, in fault or overload situations, there will always be instants in which the reference voltage of one or more phases of the current control is more restrictive than that provided by the voltage control. In these cases and in these phases, the voltage generated by the electronic converter 1 is equal to the reference voltage provided by the current control, which ensures the control of the current at a defined maximum value at the expense of a reduction in the output voltage.

Generically, the voltage control can be represented, for example, by means of the diagram of FIG. 2. Measurements of current $i_r$, $i_s$, $i_t$ (in the case of a three-phase converter with phases r, s, t) or, generally, current i (see FIGS. 1A-1B) of the electronic converter 1 and phase voltages $v_{Cr}$, $v_{Cs}$, $v_{Ct}$ at the output, for example, in terminals of the capacitors of the output filter, are used to determine voltage setpoints 22. For the sake of being concise, references $v_{Cr}$, $v_{Cs}$, $v_{Ct}$ are used throughout the present description to refer to phase voltages, where these phase voltages are understood to mean both the voltages in terminals of a capacitor of an output filter 12, and at the output, measured in the grid or load 3 (FIGS. 1A-1B), and voltages obtained from a line voltage measurement. In embodiments of the invention, these setpoints 22 are determined by means of a selected grid-forming method 20. There are various grid-forming methods 20, such as droop control and the virtual synchronous machine, but the selection thereof falls outside the scope of the present invention. From the voltage setpoints 22 and from said phase voltages $v_{Cr}$, $v_{Cs}$, $v_{Cr}$, the voltage controller 21 obtains the reference voltages $e_{r,v}$, $e_{s,v}$, $e_{t,v}$ which must be generated by the electronic converter 1 in order to operate like a voltage source. The method carried out by the voltage controller 21 falls outside the scope of the present invention. By way of non-limiting example, the voltage controller 21 can calculate the reference voltages $e_{r,v}$, $e_{s,v}$, $e_{t,v}$ by means of open-loop voltage control, control of the instantaneous voltage value on alpha and beta axes or one axes d and q, among others.

Figure 3:
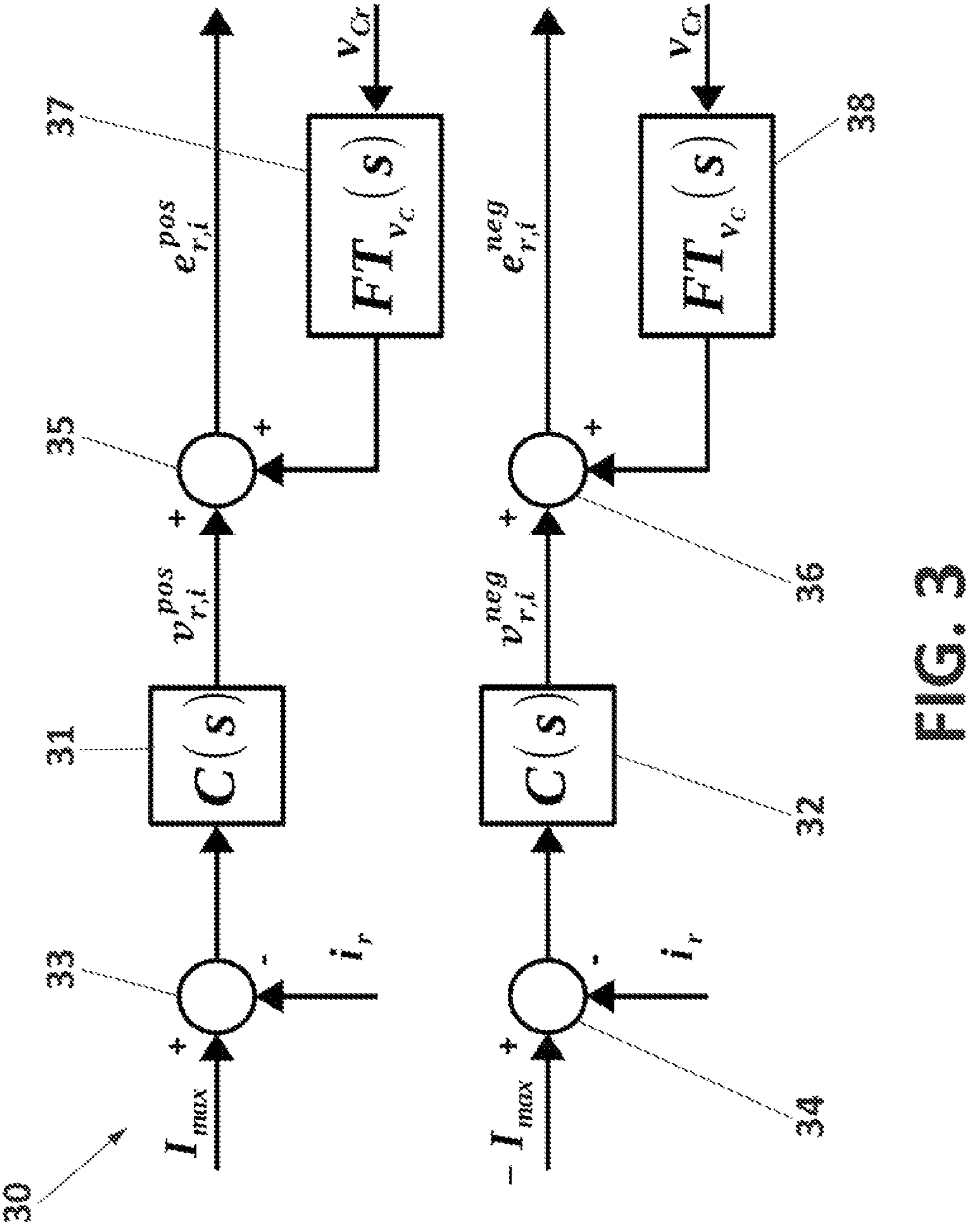
FIG. 3 shows a block diagram corresponding to the embodiment of the current control for the phase of a single-phase converter or for one of the phases of the electronic three-phase converter, which includes the loop for controlling the current at the positive maximum value and the loop for controlling the current at the negative maximum value and is similar for the rest of the phases, if there are any.

FIG. 3 shows a possible implementation of the current control 30. The proposed current control 30 has two closed control loops per phase, one for controlling the current at a positive maximum value $l_{max}$ and another one for controlling it at the negative maximum value$-l_{max}$.

As shown in FIG. 3, exemplified for phase r, but generally applicable for phases s, t, in the case of a three-phase system, the closed current control loop for controlling the current at a positive maximum value (upper part of FIG. 3) has a first adder 33 having at its positive input the reference current $l_{max}$ and at its negative input the phase intensity $i_r$. This intensity is what circulates through the corresponding phase of the converter. This intensity has been previously measured. The result of the sum is the intensity error, and it is the input of a controller C(s) 31 having as a function the generation of a voltage value $$v_{r,i}^{pos}$$

which is the positive input of a second adder 35 in which the value resulting from filtering the phase voltage $v_{Cr}$ in a filter $FT_{vc}(s)$ 37 is added to the voltage value $$v_{r,i}^{pos}$$

at its other positive input, such that the voltage $$e_{r,i}^{pos}$$

is obtained at the output of the second adder 35. The input to the filter 37 is the voltage $v_{Cr}$ at the output of the corresponding phase, for example, in terminals of a capacitor of the output filter. It should be pointed out that if the value of $i_r$ is greater than the value of the reference intensity $l_{max}$, the resulting voltage $$e_{r,i}^{pos}$$

of this closed current control loop will be less than the voltage value introduced in the second adder 35.

Similarly, the closed current control loop for controlling the current a negative maximum value (lower part of FIG. 3) has a third adder 34 (first adder of this closed loop) having at its positive input the reference current $-l_{max}$ and at its negative input the phase intensity $i_r$. The result of the sum is the intensity error of this loop, and it is the input of a controller C(s) 32 having as a function the generation of a voltage value $$v_{r,i}^{neq}$$

which is the positive input of a fourth adder 36 (second adder of this closed loop), in which the value resulting from filtering the phase voltage $v_{Cr}$ in a filter $FT_{vc}(s)$ 38 is added to the voltage value $$v_{r,i}^{neq}$$

at its other positive input, such that the voltage $$e_{r,i}^{neg}$$

is obtained at the output of the fourth adder 36. It should be pointed out that if the value of $i_r$ is less than the value of the reference intensity $-l_{max}$, the resulting voltage $$e_{r,i}^{neq}$$

of this voltage loop will be greater than the voltage value introduced in the second positive input of the fourth adder 38.

For phases s, t, not illustrated in FIG. 3, two current control loops are used for controlling the current at a positive maximum value and a negative maximum value, respectively, similar to the two loops illustrated in FIG. 3. Thus, for controlling phase s, both the first adder 33 and the third adder 34 have at their negative input the phase intensity is and the input to the filter 37 is the voltage $v_{Cs}$ at the output of phase s. In turn, for controlling phase t, both the first adder 33 and the third adder 34 have at their negative input the phase intensity it and the input to the filter 37 is the voltage $v_{Ct}$ at the output of phase t. For phase s, the two current control loops thereby provide reference voltages $$e_{s,i}^{pos} e_{s,i}^{neq}$$

And for phase t, the two current control loops provide reference voltages $$e_{t,i}^{pos}\ e_{t,i}^{neq}$$

Current references $l_{max}$, $-l_{max}$ can be configured dynamically for performing tasks such as protection of the electronic converter 1 against excessive temperatures or variation of the allowed current limit based on time during the fault in order to facilitate the dissipation thereof, among others. Another possible application of the dynamic variation of reference currents is, for example, the variation of the range of intensities within which optimal phase voltage is considered to be the reference voltage calculated by the voltage control. That is, the references of the maximum positive and negative current controls can be modified according to profiles or calculations defined from predetermined objectives.

Figure 4:
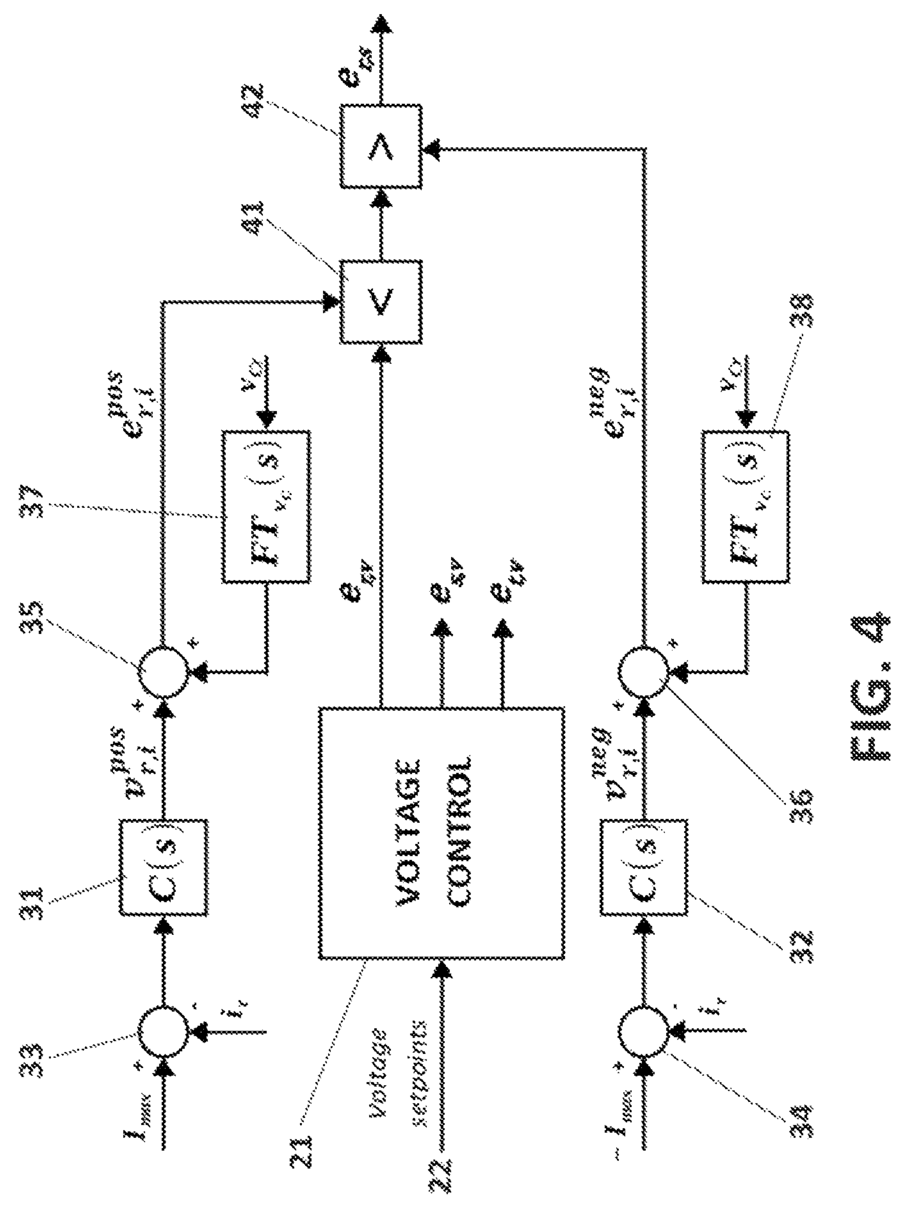
FIG. 4 shows the implementation of the control proposed in this invention for the phase of a single-phase converter or one of the phases of the three-phase converter, which is similar for the rest of the phases.

The implementation of the control proposed in the present invention is applicable to the phase of an electronic single-phase converter or to each of the phases of an electronic three-phase converter and is shown in FIG. 4. For the sake of being concise, control of phase r has been developed in further detail in FIG. 4, but the development is similar for phases s, t, as explained in relation to FIG. 3. As mentioned above, these controls, that is, voltage control (FIG. 2) and the two current controls (performed through the current control loops of FIG. 3 as described), are executed in parallel and each of them calculates, in each instant and for each phase, the reference voltage necessary for carrying out its objective. Next, a voltage is selected as the control voltage from the three reference voltages $$(e_{r,v},\ e_{r,i}^{pos},\ e_{r,i}^{neq}$$

in the case of phase r; $e_{s,v}$, $$e_{s,i}^{pos},\ e_{s,i}^{neq}$$

in the case of phase s; $e_{t,v}$, $$e_{t,i}^{pos},\ e_{t,i}^{neq}$$

in the case of phase t), as described below. The selected control voltage is applied to the corresponding phase of the conversion stage 11, 11' of the converter 1 (the voltage applied is referred to as e in FIG. 1A). The current $l_r$ of that phase will thereby be comprised between the predefined upper current limit $l_{max}$ and the predefined lower current limit $-l_{max}$.

The current control loops of FIG. 4 are identical to those of FIG. 3. According to FIG. 4, a voltage control 21 calculates reference voltages $e_{r,v}$, $e_{s,v}$, $e_{t,v}$ (one per phase, in the case of a three-phase system) from voltage setpoints 22. These voltages are the desirable phase voltages in the case of a normal operation of the converter 1, i.e., in the absence of failures in the electrical system. FIG. 4 illustrates how the selection of the desirable phase voltage is performed in two steps. In a first step, the reference voltage $e_{r,v}$ calculated by the voltage control 21 and the one calculated $$e_{r,i}^{pos}$$

by the maximum positive current control loop are compared in a first comparator 41, with the lesser of them being selected. Then, in a second comparator 42 the reference voltage selected in the preceding step, i.e., the output of the first comparator 41, and the one calculated $$e_{r,i}^{neq}$$

by the maximum negative current control are compared, and the highest one $e_{r,s}$ is selected. Furthermore, if needed, saturation techniques with anti-windup are applied in those controllers in which the reference voltage they provide is not selected. These calculations are carried out in a control unit comprising processing means, for example in a processor.

The control diagram of FIG. 4 is applicable to a single-phase converter, considering that in a single-phase converter it is only necessary for the voltage control 21 to generate one reference voltage.

The selected control voltage can then be applied to the corresponding phase of the conversion stage 11 of the electronic DC/AC converter 1, such that the current $i_r$ of that phase is comprised between the predefined upper current limit $l_{max}$ and the predefined lower current limit $-l_{max}$.

Thus, in normal operating conditions, i.e., if there is no risk of overcurrent, the selected reference voltages in all the phases in the case of a three-phase converter, or in one of the phases in the case of a single-phase converter, are determined by the voltage control. However, in the event that the current exchanged by the electronic converter 1 tends to exceed the positive reference value selected for the current control in one of the phases, the reference voltage provided by the positive maximum current control will be less than the one provided by the voltage control and greater than the one provided by the negative maximum current control, since the first adder 33 of the current control closed current control loop for controlling the current at a positive maximum value and the so-called third adder 34 (the first to act in the current control closed current loop for controlling the current at a negative maximum value) operate in the same instant in which the intensity with which the first and the second comparator 41, 42 operate is the same, and the selected reference voltage in that phase will be the calculated by the maximum positive current control loop. Likewise, when the current tends to be lower than the negative reference value in one of the phases, the reference voltage provided by the negative maximum current control will be greater than the one provided by the voltage control and less than the one provided by the positive maximum current control, and the selected reference voltage in that phase will be the calculated by the maximum negative current control loop.

Figure 6:
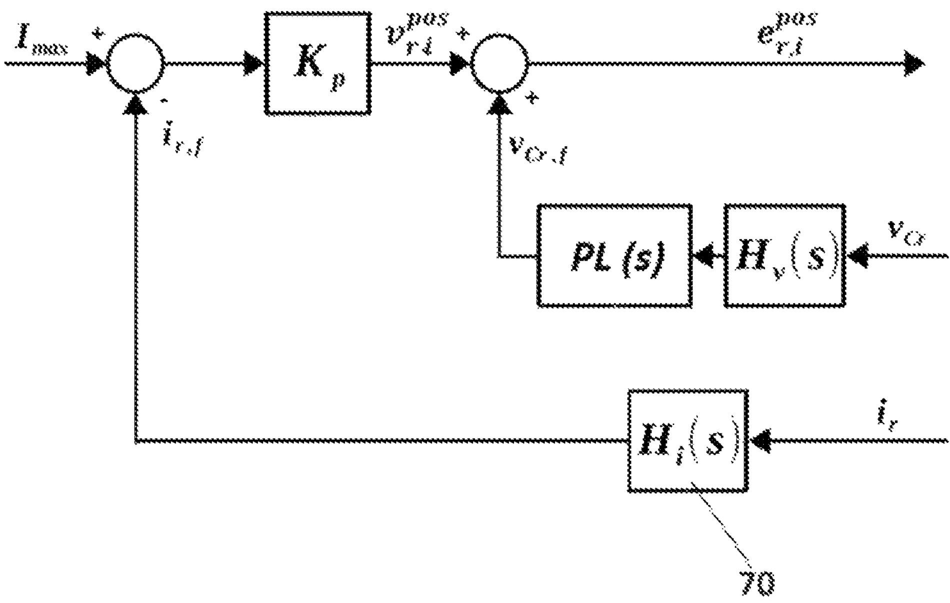
FIG. 6 shows a block diagram corresponding to the positive maximum current control for a phase of the electronic converter of a preferred embodiment of the method of the invention, the embodiment of which is similar to the negative maximum current control.

In some embodiments, like in the embodiment illustrated in FIG. 6, measurements of current $i_r$ and voltage $v_{Cr}$, (or, as the case may be, current $i_s$ and voltage $V_{Cs}$, or current it and voltage $V_{Ct}$) are filtered with filters $H_i(s)$ 70 and $H_v(s)$ 71, respectively, before they are considered for the various calculations, in order to eliminate switching harmonics and high-frequency noises. Thus, for example, the filter $H_i(s)$ 70 provides at its output a measurement of filtered current $i_{r,f}$. The filters used can implemented in both analogue and digital form, and they can be, for example, low-pass filters, high-pass filters, or a combination of different types of filters.

FIG. 6 shows a possible embodiment of the current control for the positive branch (closed current control loop for controlling the current at a positive maximum value), which is similar to that of the negative branch (closed current control loop for controlling the current at a negative maximum value). In this embodiment, the controller C(s) 31 of FIGS. 3 and 4 has been implemented as a proportional controller $K_p$ 731. Alternatively, a proportional integral (PI) controller can be used as a maximum current controller 31, 32. Regardless of the type of controller 31, 731 used, other elements can be added in current control loops, such as phase lag compensators, phase lead compensators or a combination of both. Generally, compensators can be added both in the direct chain and in the voltage feedback at the output of the controller C(s) 31, 32 in order to improve control performance. It is also possible to implement active damping from the measurement of the current of the capacitor or any other variable. For example, FIG. 6 includes a phase lead compensator PL(s) 72 applied to the measurement of voltage $v_{Cr}$, which could be previously filtered with the filter $H_v(s)$ 71. FIG. 6 shows an embodiment in which both actions are performed (filtering and compensating for the phase lead), but only one of such actions can also be performed. In the embodiment of FIG. 6, the output $v_{Cr,f}$ of the phase lead compensator 72 is added (adder 735) to the output of the controller 731 of the maximum current control of each of the phases to compensate for the lags introduced, for example, by digitalization and the voltage filter $H_v(s)$ 71 used in this embodiment.

Once the reference voltages which must be generated in each of the phases of the electronic converter 1 is selected, the problem arises that, in a three-phase system, if in one or several phases the reference voltage provided by the current control is selected, the system of selected reference voltages will be an imbalanced system. This can cause the occurrence of a non-controlled zero sequence component, which would cause the differential voltages ultimately generated in each phase to be different with respect to the selected reference voltages. As a consequence, precision for controlling the current in the phases in which it is desired to be done would be lost since the generated differential voltage, which is the voltage actually applied to the output of each phase, would not be equal to the reference voltage provided by the current control.

Figure 5:
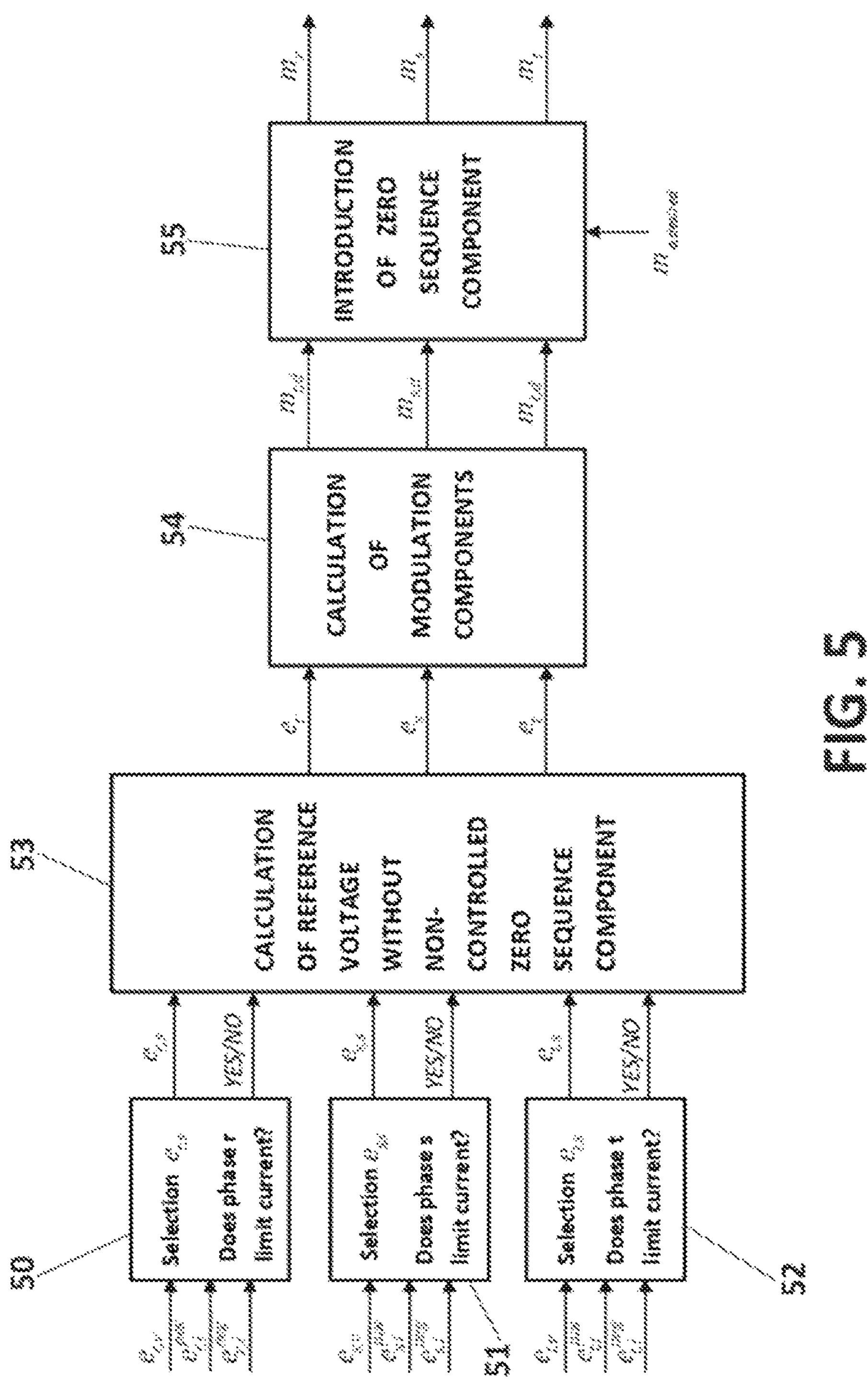
FIG. 5 shows the implementation in the form of a block diagram of the calculation of control voltages without a non-controlled zero sequence from the selected control voltages. Optional steps of calculating modulation components and of introducing a controlled zero sequence component are also included.

For this reason, if needed according to the type of grid load, an algorithm or module 53 can be introduced for calculating, for each phase r, s, t, of the electronic converter 1, a reference voltage without a non-controlled zero sequence $e_r$, $e_s$, $e_t$, from the selected reference voltages $e_{r,s}$, $e_{s,s}$, $e_{t,s}$. This is shown in FIG. 5. The non-controlled zero sequence component contained in the control voltages is thus cancelled or corrected, with the reference voltages which must be imposed in each phase of the electronic converter 1 being obtained.

Blocks 50, 51, 52 represent, for each phase of a three-phase converter, steps 41, 42 (FIG. 4) of the control of the proposed invention, in which, from the three reference voltages, one of them is selected as the selected control voltage. Thus, for example, the block 50 refers to phase r and represents the steps 41, 42 in which, from the reference voltages $e_{r,v}$, $$e_{r,i}^{pos},\ e_{r,i}^{neg}$$

one of them is selected as the selected control voltage $e_{r,s}$. The block 50 further provides a signal indicating whether ("YES" at the output of the block 50) or not ("NO" at the output of the block 50) the selected control voltage $e_{r,s}$ comes from the current control (i.e., whether it corresponds with $$e_{r,i}^{pos}$$

or with $$e_{r,i}^{neq}).$$

The blocks 51, 52 work in a similar manner, but in relation to phases s, t, respectively.

Thus, from the selected control voltages for each phase $e_{r,s}$, $e_{s,s}$, $e_{t,s}$ and from the indication, for each of them, of whether or not they originate from the respective current control, the module 53 provides, for each phase, a reference voltage without a non-controlled zero sequence $e_r$, $e_s$, $e_t$. This reference voltage without a non-controlled zero sequence $e_r$, $e_s$, $e_t$ is the one that is applied to or imposed on the corresponding phase of the conversion stage 11, 11' of the electronic converter 1.

In the event that none of the three selected control voltages $e_{r,s}$, $e_{s,s}$, $e_t$,s originates from the current control (i.e., if the three voltages originate from the voltage control), then the module 53 does not make any change. That is:

$$e_r = e_{r,s};\ e_s = e_{s,s};\ e_t = e_{t,s}$$

In the event that one of the three selected control voltages $e_{r,s}$, $e_{s,s}$, $e_t$,s originates from the (is imposed by the) current control (and, therefore, the other two control voltages originate from the voltage control), then the module 53 calculates the following reference voltages without a non-controlled zero sequence $e_r$, $e_s$, $e_t$:

a) If the voltage of phase r is the one originating from the current control:

$$e_r = e_{r,s};\ e_s = \frac{e_{s,s} - e_{r,s} - e_{t,s}}{2};\ e_t = \frac{e_{t,s} - e_{r,s} - e_{s,s}}{2}$$

That is, the selected reference voltage in phase r is maintained as selected, and the two reference voltages (phases s, t) originating from the voltage control are adapted.

b) If the voltage of phase s is the one originating from the current control:

$$e_s = e_{s,s};\ e_r = \frac{e_{r,s} - e_{s,s} - e_{t,s}}{2};\ e_t = \frac{e_{t,s} - e_{r,s} - e_{s,s}}{2}$$

That is, the selected reference voltage in phase s is maintained as selected, and the two reference voltages (phases r, t) originating from the voltage control are adapted.

c) If the voltage of phase t is the one originating from the current control:

$$e_t = e_{t,s};\ e_r = \frac{e_{r,s} - e_{s,s} - e_{t,s}}{2};\ e_s = \frac{e_{s,s} - e_{r,s} - e_{t,s}}{2}$$

That is, the selected reference voltage in phase t is maintained as selected, and the two reference voltages (phases r, s) originating from the voltage control are adapted.

In the event that two of the three selected control voltages $e_{r,s}$, $e_{s,s}$, $e_{t,s}$, are imposed by the current control (and, therefore, the other reference voltage originates from the voltage control), then the module 53 calculates the following reference voltages without a non-controlled zero sequence $e_r$, $e_s$, $e_t$:

a) If the voltages of phases r and s are the ones imposed by the current controller:

$$e_r = e_{r,s};\ e_s = e_{s,s};\ e_t = -(e_{r,s} - e_{s,s})$$

b) If the voltages of phases r and t are the ones imposed by the current controller:

$$e_r = e_{r,s};\ e_t = e_{t,s};\ e_s = -(e_{r,s} - e_{t,s})$$

c) If the voltages of phases s and t are the ones imposed by the current controller:

$$e_s = e_{s,s};\ e_t = e_{t,s};\ e_r = -(e_{s,s} - e_{t,s})$$

Lastly, in the event that the three selected control voltages $e_{r,s}$, $e_{s,s}$, $e_{t,s}$, are imposed by the current control, then the module 53 prioritizes limiting current in the two phases with the highest current level. That is, the reference voltages without a non-controlled zero sequence are calculated like in the case where two of the three selected reference voltages $e_{r,s}$, $e_{s,s}$, $e_{t,s}$, are imposed by the current control:

a) If phases r and s are the two phases with the highest current:

$$e_r = e_{r,s};\ e_s = e_{s,s};\ e_t = -(e_{r,s} - e_{s,s})$$

b) If phases r and t are the two phases with the highest current:

$$e_r = e_{r,s};\ e_t = e_{t,s};\ e_s = -(e_{r,s} - e_{t,s})$$

c) If the two phases s and t are the two phases with the highest current:

$$e_s = e_{s,s};\ e_t = e_{t,s};\ e_r = -(e_{s,s} - e_{t,s})$$

In summary, generally, in the phase or phases in which the reference voltage is imposed by the current control, the voltage that is applied by the electronic converter 1 in that phase is the selected reference voltage (the one provided by the current control), whereas in the phase or phases in which the reference voltage is imposed by the voltage control, the voltage which is applied by the electronic converter 1 in that phase is modified with respect to the reference voltage in order to eliminate the zero sequence component introduced by the control of the present invention. This is true except, as explained, in the case where the three reference voltages are imposed by the current control, in which case two of them must be prioritised. The non-controlled zero sequence component introduced by the proposed control is thus cancelled or minimised while at the same time it is ensured that the generated voltage is equal to the reference voltage in the phases in which this voltage originates from the current control.

Optionally, in addition to the reference voltages without a non-controlled zero sequence $e_r$, $e_s$, $e_t$ being imposed on or applied to the corresponding phase of the electronic converter 1, they can also be used for calculating modulation components $m_{r,d}$, $m_{s,d}$, $m_{t,d}$ as indicated in the block 54 of FIG. 5. The calculation of modulation components 54 is conventional and falls outside the scope of the present invention. These modulation components can be used, for example, for controlling switches of the converter 1, for example, according to a pulse width modulation (PWM) method. That is, a PWM modulator can use the modulation components to generate the firing orders of the switches making up the converter 1.

Also optionally, a desired zero sequence component $m_{o\ desired}$ can be introduced into the modulation components $m_{r,d}$, $m_{s,d}$, $m_{t,d}$, as shown in FIG. 5. Modulation components with a zero sequence component $m_r$, $m_s$, $m_t$ are thus obtained. The calculation of a modulation component with a zero sequence component $m_r$, $m_s$, $m_t$ is conventional and falls outside the scope of the present invention. These modulation components can be used for the same purpose as the modulation components $m_{r,d}$, $m_{s,d}$, $m_{t,d}$, i.e., for example, for controlling switches of the converter 1, for example according to a pulse width modulation (PWM) method.

By way of example, the three-phase embodiment is applied, for example, to an electronic converter 1 like the one illustrated in FIG. 1A or 1B, controlled as a voltage source and at the input of which there is connected a battery (as a storage system 2) and at the output of which it is connected to a set of isolated alternating loads 3 through an LC output filter and a transformer (not illustrated).

Figure 7:
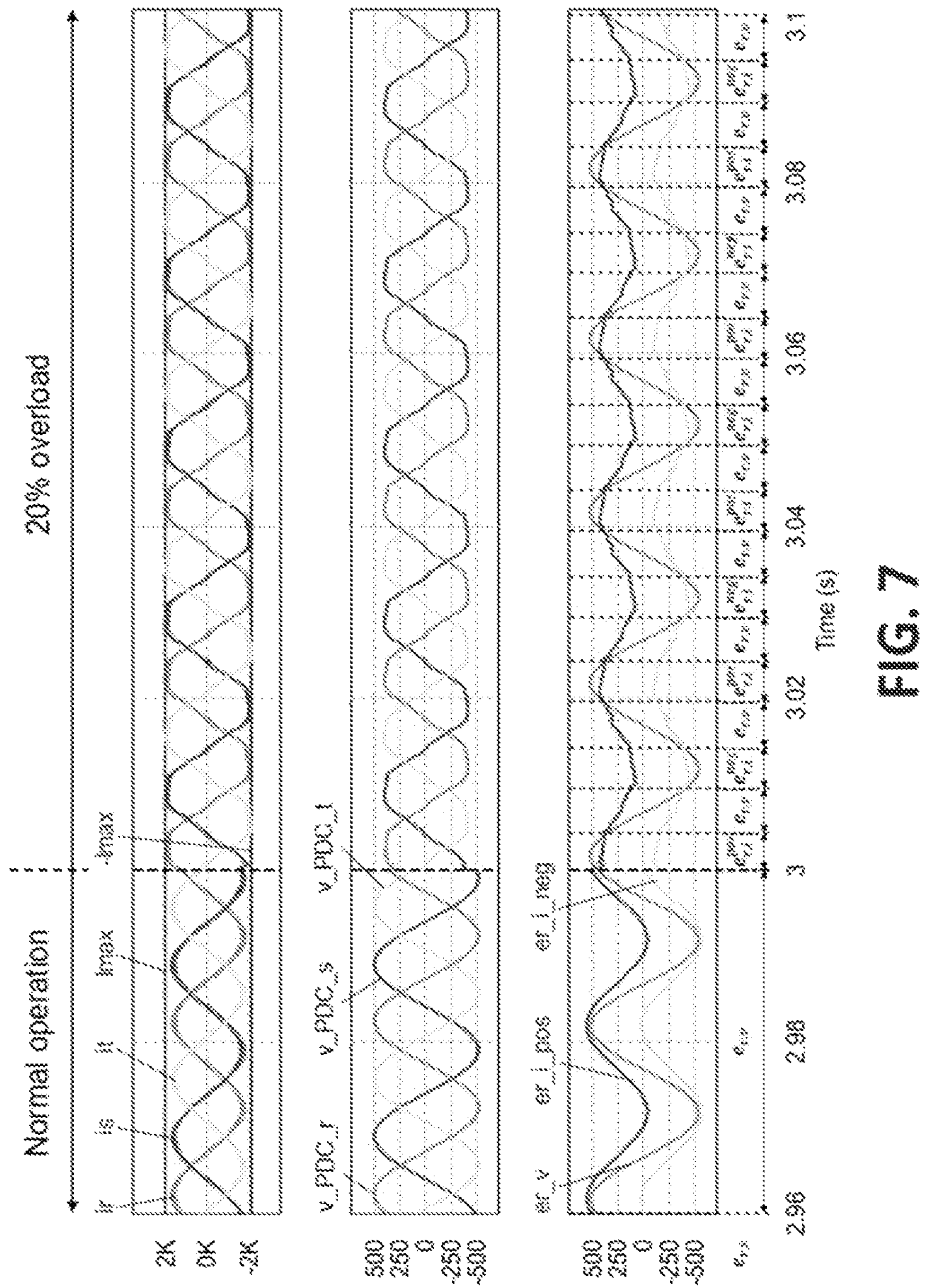
FIG. 7 shows the results of the simulation of the electronic converter with the proposed method with respect to a 20% overload.
Figure 8:
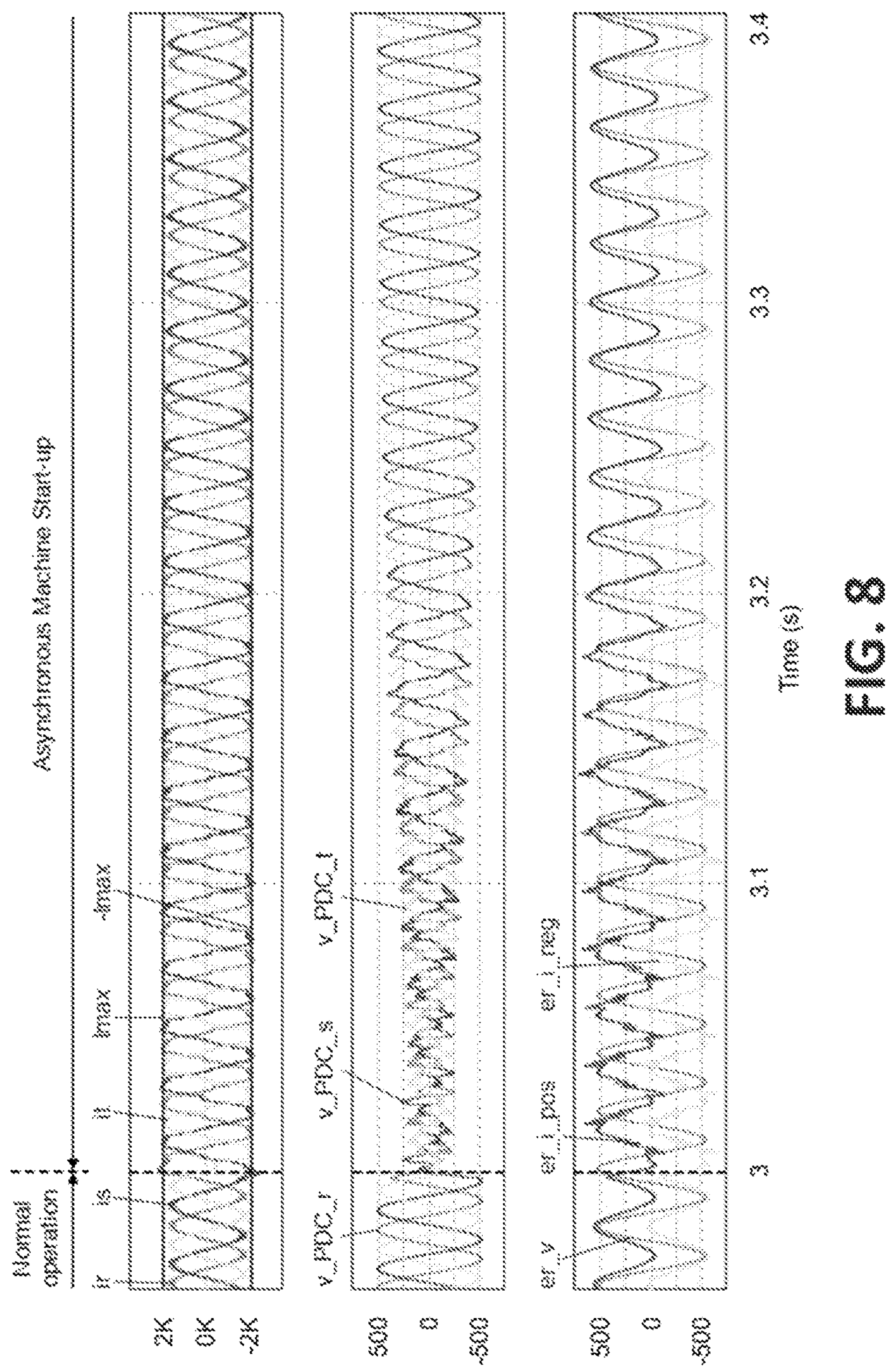
FIG. 8 shows the results of the simulation of the electronic converter with the proposed method with respect to the connection and start-up of an asynchronous machine.
Figure 9:
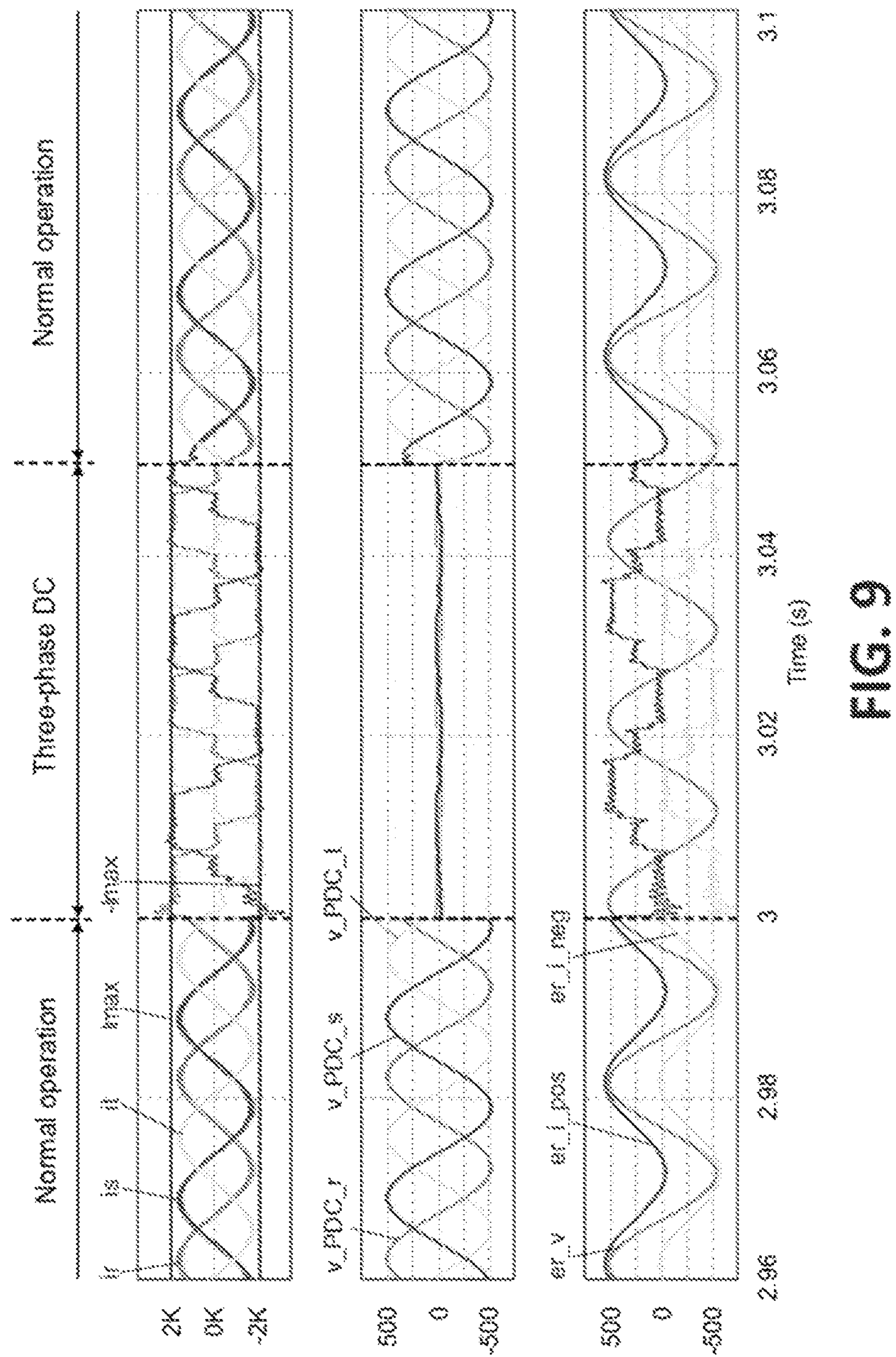
FIG. 9 shows the results of the simulation of the electronic converter with the proposed method with respect to a three-phase short circuit of Usc=5%.
Figure 10:
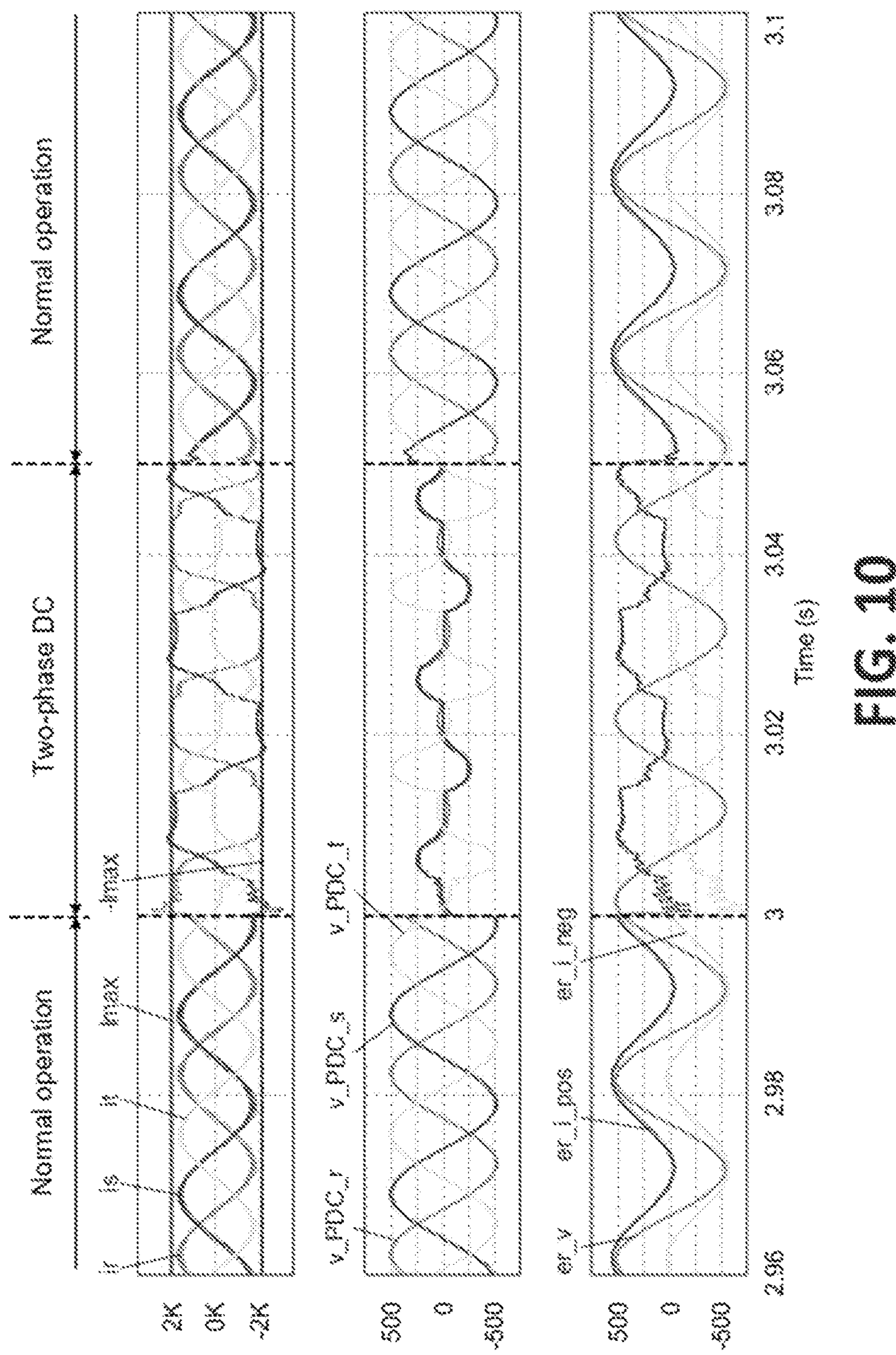
FIG. 10 shows the results of the simulation of the electronic converter with the proposed method with respect to a two-phase short circuit between phases r and s of Usc=5%.
Figure 11:
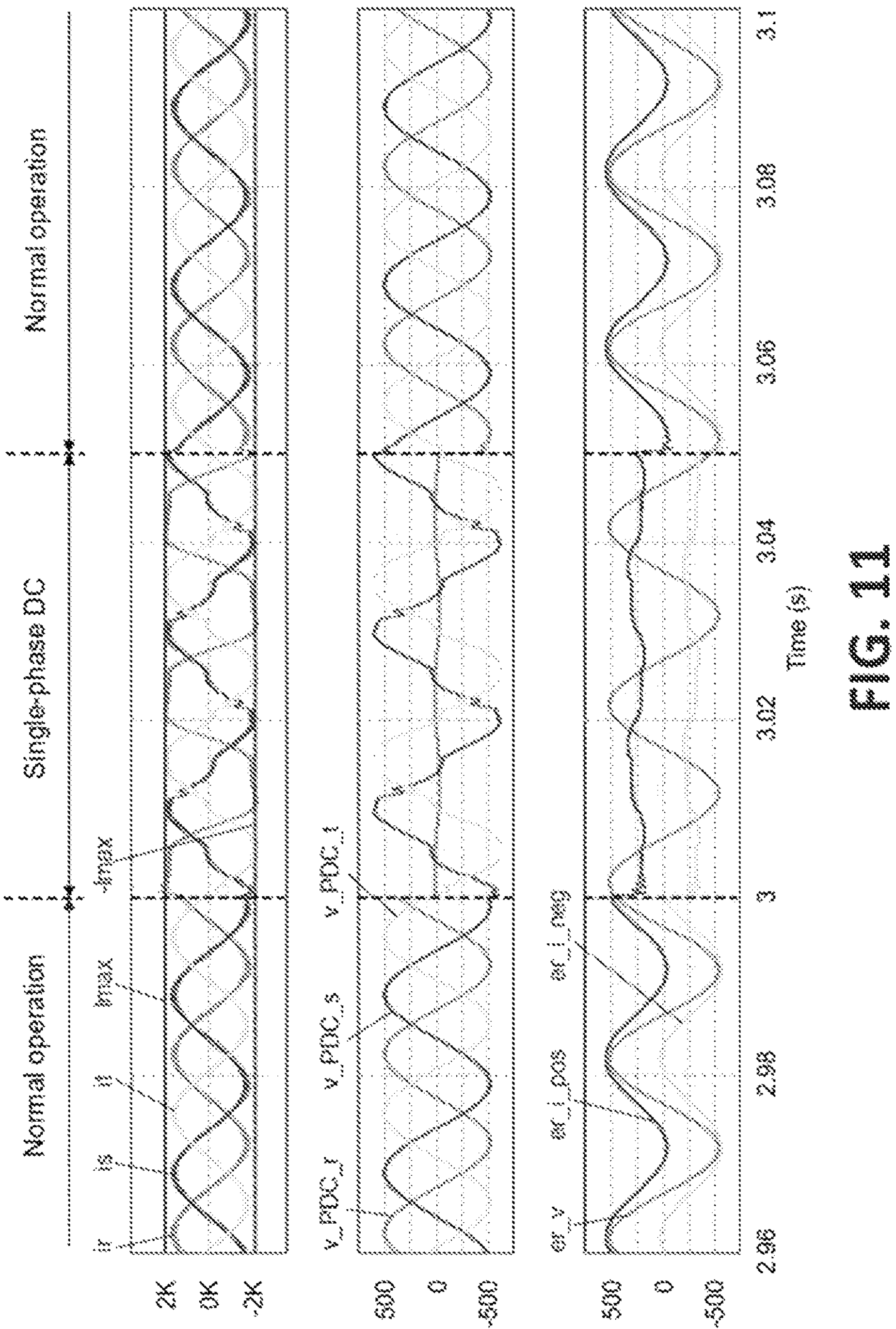
FIG. 11 shows the results of the simulation of the electronic converter with the proposed method with respect to an r phase and neutral single-phase short circuit of Usc=5%.

The proposed control method has been simulated in 5 situations in which the occurrence of overcurrents in the electronic converter 1 takes place due to different events: 20% permanent overload (FIG. 7), transient overload due to the asynchronous machine start-up (FIG. 8), three-phase short circuit with Usc=5% (FIG. 9), two-phase short circuit with Usc=5% (FIG. 10) and single-phase short circuit with Usc=5% (FIG. 11). In the simulation results, the first graph shows is the currents (Amperes) exchanged by the electronic converter 1 and the positive and negative current references (in Amperes) defined for current control; the second graph shows phase voltages (in Volts) generated in terminals of the load; and the third graph shows the reference voltages (in Volts) of phase r calculated in parallel by the voltage control and by the positive and negative branches of the current control. As mentioned above, the selected reference voltage in each instant is the most restrictive, which corresponds to the one having an intermediate value between the 3 reference voltages calculated by the control loops. By way of example, FIG. 7 identifies the selected reference voltage in phase r in each instant $$\left(e_{r,v},\ e_{r,i}^{pos}\ \text{and}\ e_{r,i}^{neq}\right).$$

In all the cases, before the events causing overcurrents to occur take place, the electronic converter 1 supplies a load at 80% of its rated current, and since it is not necessary to limit current in this situation, the reference voltages provided by the voltage control are always the most restrictive, so they are between the other two and are the ones that are selected. It can thereby be observed how, in normal operating conditions, reference voltages are determined by the voltage control. However, from the instant in which the corresponding problematic event takes place (t=3s), the reference voltages provided by the current control change and in some instants become the most restrictive, so they are the ones that are selected, such that the current is maintained between the defined reference values.

Considering the results obtained in overload situations, it can be observed how, with a 20% overload (FIG. 8), the voltage in terminals of the load remain within the allowed values, which demonstrates that with the method of the invention it is possible to permanently operate with small overloads without the rise of a overcurrent. Furthermore, in the event that transient overloads, such as an asynchronous machine start-up (FIG. 8), were to arise, it can be observed how the generated voltage is initially limited to a large extent in order to limit the current, but as the current demanded by the load gradually decreases, the voltage increases until recovering the operation of the electronic converter 1 as a voltage source.

With respect to short circuit (SC) situations, it can be observed that although severe three-phase SCs (FIG. 9), two-phase SCs (FIG. 10) or single-phase SCs (FIG. 11) occur, the proposed control provides the electronic converter 1 with the capability to not lose control of the current at any time, without the need to implement a complementary hardware protection method. Likewise, when the SC is dissipated in the three cases, the operation of the electronic converter 1 as a voltage source is very rapidly recovered.

In this text, the term "comprises" and its derivations (such as "comprising", etc.) must not be understood in an exclusive sense, i.e., these terms must not be interpreted as excluding the possibility of what is described and defined may include further elements, steps, etc.

In the context of the present invention, the term "approximately" and terms related to it (such as "approximate", etc.) must be interpreted as indicating values very close to those accompanying said term. That is, a deviation within reasonable limits with respect to an exact value should be accepted, because a person skilled in the art will understand that such deviation with respect to the indicated values may be unavoidable due to measurement imprecisions, etc. The same applies to the terms "about", "around" and "substantially".

The invention is obviously not limited to the specific embodiment(s) that have been described, rather it also covers any variation that may be considered by any person skilled in the art (for example, in relation to the choice of materials, dimensions, components, configuration, etc.), within the general scope of the invention as defined in the claims.

The invention claimed is:

1. A control method for an electronic DC/AC three-phase converter (1), characterised in that the method comprises, for each phase of the conversion stage (11, 11') of the electronic DC/AC converter (1):

calculating, by means of a voltage controller (21), a first reference voltage ($e_{r,v}$, $e_{s,v}$, $e_{t,v}$) from predefined voltage setpoints (22) and a phase voltage ($V_{c_r}$, $V_{c_s}$, $V_{c_t}$);

calculating, by means of a current controller (30), a second reference voltage $$\left(e_{r,i}^{pos},\ e_{s,i}^{pos},\ e_{t,i}^{pos}\right)$$

based on a difference between a predefined upper current limit ($I_{max}$) and the current ($i_r$, $i_s$, $i_t$) of said at least one phase, and on the phase voltage ($V_{c_r}$, $V_{c_s}$, $V_{c_t}$);

calculating, by means of the current controller (30), a third reference voltage $$\left(e_{r,i}^{neg},\ e_{s,i}^{neg},\ e_{t,i}^{neg}\right)$$

based on a difference between a predefined lower current limit ($I_{max}$) and the current ($i_r$, $i_s$, $i_t$) of said one phase, and on the phase voltage ($V_{c_r}$, $V_{c_s}$, $V_{c_t}$);

comparing the first reference voltage ($e_{r,v}$, $e_{s,v}$, $e_{t,v}$) with the second reference voltage $$\left(e_{r,i}^{pos},\ e_{s,i}^{pos},\ e_{t,i}^{pos}\right);$$

selecting the lowest reference voltage from the first reference voltage ($e_{r,v}$, $e_{s,v}$, $e_{t,v}$) and the second reference voltage $$\left(e_{r,i}^{pos},\ e_{s,i}^{pos},\ e_{t,i}^{pos}\right);$$

comparing the selected reference voltage with the third reference voltage $$\left(e_{r,i}^{neg},\ e_{s,i}^{neg},\ e_{t,i}^{neg}\right);$$

selecting as the fourth reference voltage ($e_{r,s}$, $e_{s,s}$, $e_{t,s}$) that should be generated by the conversion stage (11, 11') of the electronic DC/AC three-phase converter (1) the highest reference voltage from the selected reference voltage and the third reference voltage $$\left(e_{r,i}^{neg},\ e_{s,i}^{neg},\ e_{t,i}^{neg}\right);$$

obtaining (53) a reference voltage without a non-controlled zero sequence ($e_r$, $e_s$, $e_t$) for each phase from said selected fourth reference voltages ($e_{r,s}$, $e_{s,s}$, $e_{t,s}$) to compensate for the effect of a non-controlled zero sequence component contained in the selected fourth reference voltages ($e_{r,s}$, $e_{s,s}$, $e_{t,s}$), applying the obtained reference voltage without the non-controlled zero sequence ($e_r$, $e_s$, $e_t$) to the respective phase of the conversion stage (11, 11') of the electronic DC/AC three-phase converter (1).

2. The control method according to claim 1, wherein the phase voltage ($V_{c_r}$, $V_{c_s}$, $V_{c_t}$) is a voltage ($V_c$) measured at terminals of a capacitor of an output filter (12) of the phase.

3. The control method according to claim 1, wherein the phase voltage ($V_{c_r}$, $V_{c_s}$, $V_{c_t}$) is a voltage ($V_{PDC}$) measured at the output of the electronic DC/AC converter (1).

4. The control method according to claim 1, wherein the phase voltage ($V_{c_r}$, $V_{c_s}$, $V_{c_t}$) is a voltage obtained from a line voltage measurement.

5. The control method according to claim 1, wherein the step of calculating the second reference voltage $$\left(e_{r,i}^{pos}, e_{s,i}^{pos}, e_{t,i}^{pos}\right)$$

comprises:

providing as input to a first controller module (31) the difference between the upper current limit ($I_{max}$) and the current ($i_r$, $i_s$, $i_t$) of the at least one phase; and adding the phase voltage ($V_{c_r}$, $V_{c_s}$, $V_{c_t}$) to a voltage $$\left(v_{r,i}^{pos}, v_{s,i}^{pos}, v_{t,i}^{pos}\right)$$

at the output of the first controller module (31), wherein the first controller module (31) is a proportional regulator.

6. The control method according to claim 5, comprising, before said phase voltage ($V_{c_r}$, $V_{c_s}$, $V_{c_t}$) is added to the output voltage $$\left(v_{r,i}^{pos}, v_{s,i}^{pos}, v_{t,i}^{pos}\right)$$

of the first controller module:

filtering the phase voltage ($V_{c_r}$, $V_{c_s}$, $V_{c_t}$) by means of a voltage filter (71); and providing a phase lead for the filtered phase voltage by means of a phase lead compensator (72).

7. The control method according to claim 1, wherein the step of calculating the third reference voltage $$\left(e_{r,i}^{neg}, e_{s,i}^{neg}, e_{t,i}^{neg}\right)$$

comprises:

providing as input to a second controller module (32) the difference between the lower current limit ($-I_{max}$) and the phase current ($i_r$, $i_s$, $i_t$); and adding the phase voltage ($V_{c_r}$, $V_{c_s}$, $V_{c_t}$) to a voltage $$\left(v_{r,i}^{neg}, v_{s,i}^{neg}, v_{t,i}^{neg}\right)$$

at the output of the second controller module (32), wherein the second controller module (32) $i_s$ a proportional regulator.

8. The control method according to claim 7, comprising, before said phase voltage ($V_{c_r}$, $V_{c_s}$, $V_{c_t}$) is added to the output voltage $$\left(v_{r,i}^{neg}, v_{s,i}^{neg}, v_{t,i}^{neg}\right)$$

of the second controller module (32):

filtering the phase voltage ($V_{c_r}$, $V_{c_s}$, $V_{c_t}$) by means of a voltage filter (71); and providing a phase lead for the filtered phase voltage by means of a phase lead compensator (72).

9. The control method according to claim 1, comprising calculating the setpoint voltage values (22) by the grid-forming method.

10. The control method according to claim 1, wherein if none of the three selected fourth reference voltages ($e_{r,s}$, $e_{s,s}$, $e_{t,s}$) is imposed by the current controller (30), then the obtained reference voltages without a non-controlled zero sequence ($e_r$, $e_s$, $e_t$) coincide with the selected fourth reference voltages ($e_{r,s}$, $e_{s,s}$, $e_{t,s}$), i.e.:

$$e_r = e_{r,s};\ e_s = e_{s,s};\ e_t = e_{t,s}.$$

11. The control method according to claim 1, wherein if one of the three selected fourth reference voltages ($e_{r,s}$, $e_{s,s}$, $e_{t,s}$) is imposed by the current controller (30), and therefore the other two selected control voltages are imposed by the voltage controller (21), then the obtained reference voltages without a non-controlled zero sequence ($e_r$, $e_s$, $e_t$) are calculated as follows:

if the voltage of phase r $i_s$ the one imposed by the current controller (30):

$$e_r = e_{r,s};\ e_s = \frac{e_{s,s} - e_{r,s} - e_{t,s}}{2};\ e_t = \frac{e_{t,s} - e_{r,s} - e_{s,s}}{2}$$

if the voltage of phase s $i_s$ the one imposed by the current controller (30):

$$e_s = e_{s,s};\ e_r = \frac{e_{r,s} - e_{s,s} - e_{t,s}}{2};\ e_t = \frac{e_{t,s} - e_{r,s} - e_{s,s}}{2}$$

if the voltage of phase t is the one imposed by the current controller (30):

$$e_t = e_{t,s};\ e_r = \frac{e_{r,s} - e_{s,s} - e_{t,s}}{2};\ e_s = \frac{e_{s,s} - e_{r,s} - e_{t,s}}{2}.$$

12. The control method according to claim 1, wherein if two of the three selected fourth reference voltages ($e_{r,s}$, $e_{s,s}$, $e_{t,s}$) are imposed by the current controller (30), and therefore the other selected control voltage $i_s$ imposed by the voltage controller (21), then the obtained reference voltages without a non-controlled zero sequence ($e_r$, $e_s$, $e_t$) are calculated as follows:

if the voltages of phases r and s are the ones imposed by the current controller (30):

$$e_r = e_{r,s};\ e_s = e_{s,s};\ e_t = -(e_{r,s} - e_{s,s})$$

if the voltages of phases r and t are the ones imposed by the current controller (30):

$$e_r = e_{r,s};\ e_t = e_{t,s};\ e_s = -(e_{r,s} - e_{t,s})$$

if the voltages of phases s and t are the ones imposed by the current controller (30):

$$e_s = e_{s,s};\ e_t = e_{t,s};\ e_r = -(e_{s,s} - e_{t,s}).$$

13. The control method according to claim 1, wherein if the three selected fourth reference voltages ($e_{r,s}$, $e_{s,s}$, $e_{t,s}$) are imposed by the current controller (30), then the two control voltages corresponding to the two phases with the highest current are imposed, i.e.:

if phases r and s are the two phases with the highest current:

$$e_r = e_{r,s};\ e_s = e_{s,s};\ e_t = -(e_{r,s} - e_{s,s})$$

if phases r and t are the two phases with the highest current:

$$e_r = e_{r,s};\ e_t = e_{t,s};\ e_s = -(e_{r,s} - e_{t,s})$$

if the two phases s and t are the two phases with the highest current:

$$e_s = e_{s,s};\ e_t = e_{t,s};\ e_r = -(e_{s,s} - e_{t,s}).$$

14. The control method according to claim 1, comprising:

calculating modulation components ($m_{r,d}$, $m_{s,d}$, $m_{t,d}$) from the obtained reference voltages without a non-controlled zero sequence ($e_r$, $e_s$, $e_t$), controlling switches of the conversion stage of the electronic DC/AC converter (1) from said modulation components ($m_{r,d}$, $m_{s,d}$, $m_{t,d}$).

15. The control method according to claim 14, wherein for controlling said switches, a pulse width modulator uses said modulation components ($m_{r,d}$, $m_{s,d}$, $m_{t,d}$) or modulation components with a zero sequence component ($m_r$, $m_s$, $m_t$) for generating the firing orders of the switches.

16. The control method according to claim 1, comprising:

calculating modulation components ($m_{r,d}$, $m_{s,d}$, $m_{t,d}$) from the obtained reference voltages without a non-controlled zero sequence ($e_r$, $e_s$, $e_t$), introducing a desired zero sequence component (mor desired) in said modulation components ($m_{r,d}$, $m_{s,d}$, $m_{t,d}$), thus obtaining modulation components with a zero sequence component ($m_r$, $m_s$, $m_t$), controlling switches of the conversion stage of the electronic DC/AC converter (1) from said modulation components with a zero sequence component ($m_r$, $m_s$, $m_t$).

17. The control method according to claim 1, wherein the method is repeated at set time instants according to a clock frequency.

18. The control method according to claim 1, further comprising reducing the predefined voltage setpoints (22) if one of the control voltages is imposed by the current controller (30).

19. A control system for an electronic DC/AC three-phase converter (1) which carries out the method described in claim 1.

20. The control system according to claim 19, wherein the voltage controller (21) further comprises a control loop for reducing the predefined voltage setpoints (22) if one of the control voltages is imposed by the current controller (30).

* * * * *